US006291382B1

(12) United States Patent
Köppl et al.

(10) Patent No.: US 6,291,382 B1
(45) Date of Patent: Sep. 18, 2001

(54) METALLOCENES, POLYMERIZATION CATALYST SYSTEMS, THEIR PREPARATION, AND USE

(75) Inventors: Alexander Köppl; Helmut G. Alt, both of Bayreuth (DE); M. Bruce Welch, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/317,300

(22) Filed: May 24, 1999

(51) Int. Cl.[7] .............................. B01J 31/00; B01J 37/00; C08F 4/02; C08F 4/60; C08F 4/94
(52) U.S. Cl. .................. 502/103; 502/108; 502/111; 502/117; 526/160; 526/943
(58) Field of Search ..................... 802/103, 108, 802/111, 117; 526/160, 943

(56) References Cited

U.S. PATENT DOCUMENTS

| | | | |
|---|---|---|---|
| 5,086,025 | * 2/1992 | Chang | 502/103 |
| 5,324,801 | 6/1994 | Brekner et al. | 526/160 |
| 5,436,305 | 7/1995 | Alt et al. | 526/160 |
| 5,466,766 | * 11/1995 | Patsidis et al. | 502/117 |
| 5,498,581 | 3/1996 | Welch et al. | 502/102 |
| 5,668,230 | 9/1997 | Schertl et al. | 526/160 |
| 5,714,425 | 2/1998 | Chabrand et al. | 502/117 |
| 5,733,834 | * 3/1998 | Soga et al. | 502/117 |
| 5,747,405 | * 5/1998 | Little et al. | 502/117 |
| 5,753,785 | 5/1998 | Reddy et al. | 526/75 |

FOREIGN PATENT DOCUMENTS

WO 98/52686   11/1998 (WO).

* cited by examiner

Primary Examiner—Mark L. Bell
Assistant Examiner—J. Pasterczyk
(74) Attorney, Agent, or Firm—Edward L. Bowman

(57) ABSTRACT

Metallocenes having a 9-fluorenyl group and another cyclic dienyl group connected by a single carbon having a terminally unsaturated hydrocarbyl substituent wherein the 9-fluorenyl group has a hydrocarbyl substituent in the 4 position, olefin polymerization catalyst systems prepared therefrom, and the use of such catalyst systems are disclosed.

36 Claims, No Drawings

METALLOCENES, POLYMERIZATION CATALYST SYSTEMS, THEIR PREPARATION, AND USE

This invention relates to certain metallocenes. In another aspect this invention relates to the polymerization of olefins. In another aspect this invention relates to metallocene based catalyst systems for the polymerization of olefins.

BACKGROUND OF THE INVENTION

The discovery that metallocenes of transition metals can be used as catalysts for the polymerization of olefins has led to significant amounts of research since it was found that different metallocenes could produce different types of polymers. One of the earliest references to the use of metallocenes in the polymerization of olefins is U.S. Pat. No. 2,827,446 which discloses a homogeneous, i.e. liquid, catalyst system of bis(cyclopentadienyl) titanium dichloride and an alkyl aluminum compound. The activity of such systems was not, however, as high as would be desired. It was latter discovered that more active catalyst systems would result if the metallocene was employed with an alkylaluminoxane cocatalyst, such as that disclosed in U.S. Pat. No. 3,242,099.

U.S. Pat. Nos. 5,498,581 and 5,565,592 revealed a particularly interesting class of new metallocenes that are suitable for use in the polymerization of olefins, namely bridged metallocenes having a terminally unsaturated group extending from the bridge. One particularly preferred metallocene of that type was the metallocene which can be called 1-(9-fluorenyl)-1-(cyclopentadienyl)-1-(methyl)-1-(but-3-enyl) methane zirconium dichloride. The metallocenes of that type were found to be particularly desirable in that they allowed for the production of solid catalyst systems that could be employed effectively in slurry polymerization processes.

The present invention is based on the subsequent discovery that fluorenyl containing metallocenes which have a bridge with a terminally unsaturated group and also a hydrocarbyl substituent on the 4 position of the fluorenyl group produce unexpected benefits.

SUMMARY OF THE INVENTION

In accordance with the present invention there is provided a bridged metallocene in which two cyclodienyl-type groups are connected by a single carbon bridge which contains a terminally unsaturated substituent, one of the cyclodienyl groups being a 9-fluorenyl radical having hydrocarbyl substitution at the 4 position. In accordance with another aspect of the present invention there is provided olefin catalyst compositions comprising such metallocenes and a suitable cocatalyst. In accordance with yet another aspect of the present invention there is provided a process for polymerizing olefins using such catalyst systems.

DETAILED DESCRIPTION OF THE INVENTION

The metallocenes of the present invention include those represented by the formula $R(Z)(Z)MQ_k$ wherein each Z bound to M and is the same or different and is a cyclodienyl-type ligand selected from substituted or unsubstituted cyclopentadienyl, indenyl, tetrahydroindenyl, octahydrofluorenyl, and fluorenyl ligands; with the further proviso that at least one Z is a 9-fluorenyl having a hydrocarbyl substituent at the 4 position, R is a structural bridge linking the Z's which is a single carbon atom connecting the Z's and which has its other valences satisfied by a terminally unsaturated hydrocarbyl substituent, preferably having 2 to 20 carbon atoms, and by hydrogen or a hydrocarby group, preferably having 1 to 10 carbon atoms, and M is a metal selected from the group consisting of 4, 5, and 6 metals of the periodic table, each Q is the same or different and is selected from the group consisting of hydrogen, halogens, and oregano radicals; k is a number sufficient to fill out the remaining valances of M.

A particularly preferred type of bridged metallocene includes those in which the olefinically unsaturated substituent has the formula

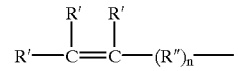

wherein R" is a hydrocarbyl diradical having 1 to 20 carbon atoms; more preferably 2 to 10; n is 1 or 0, and each R' is individually selected from the group consisting of organo radicals, most preferably alkyl radicals, having 1 to 10 carbon atoms and hydrogen. Most preferably R" has at least two carbons in its main alkylene chain, i.e. it is a divalent ethylene radical or a higher homolog thereof.

The present invention thus envisions bridged metallocenes prepared from vinyl terminated branched bridged ligands of the formula

1)

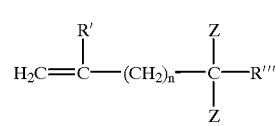

wherein n is a number typically in the range of about 0 to 20; more preferably 2–10; wherein R' is selected from hydrogen, or organo groups having 1 to 10 carbons and R'" is selected from hydrogen or hydrocarbyl radicals having 1 to 20 carbon aloms. Currently preferred R' components are hydrogen or alkyl groups typically having 1 to 10 carbon atoms, or aryl groups typically having 6 to 10 carbon atoms. Each Z is a cyclodienyl-type radical as described earlier.

The metallocenes of such olefinically unsaturated branched-bridged ligands can be prepared by reacting the olefinically branched-bridged bis(cyclopentadienyl-type) ligand with an alkali metal alkyl to produce a divalent ligand salt that is then reacted with the transition metal compound to yield the metallocene, using the techniques generally known in the art for forming such metallocenes. See, for example, the technique disclosed in U.S. Pat. No. 5,436,305, the disclosure of which is incorporated herein by reference.

The necessary olefinically branched-bridged organic compounds suitable for use as ligands for such metallocenes can be made by reacting a suitable alkeryl ketone with an alkali metal salt of a cyclopentadiene-type compound such as cyclopentadiene or indene to form a 6-terminal alkenyl fulvene then reacting the fulvene with an alkali metal salt of fluorene.

Some typical examples of metallocenes containing a substituent having olefinic unsaturation include 1-(cyclopentadienyl)-1-(4-methyl-9-fluorenyl)-1-(but-3-enyl)-1-(methyl) methane zirconium dichloride; 1-(cyclopentadienyl)-1-(4-methyl-9-fluorenyl)-1-(but-3-enyl)-1-(methyl) methane zirconium dimethyl; 1-(3-methyl-cyclopentadienyl)-1-(4-methyl-9-fluorenyl)-1-(but-3-enyl)-1-(methyl) methane zirconium dichloride; 1-(indenyl)-1-(4- methyl-9-fluorenyl)-1-(but-3-enyl)-1-(phenyl) methane zirconium dichloride; 1-(cyclopentadienyl)-1-(4,7-dimethyl-9-fluorenyl)-1-(pent-4-enyl)-1-(methyl) methane zirconium dichloride; 1-(cyclopentadienyl)-1-(4-methyl-9-fluorenyl)-1-(but-3-enyl)-1-(phenyl) methane zirconium dichloride; and the like.

The inventive metallocenes are suitable for preparing catalysts for the polymerization of olefins. Such catalyst systems are prepared by combining at least ore inventive metallocene with a suitable cocatalyst. It is also within the scope of the present invention to use two or more of the inventive metallocenes or an inventive metallocene in combination with one or more other metallocenes.

Examples of suitable cocatalysts include generally any of those organometallic compounds which have been found suitable as cocatalysts for metallocenes in the past. Some typical examples include organometallic compounds of the metals of Groups 1, 2, and 13 of the Periodic Table. Examples of compounds that have been used in the past as cocatalysts for metallocenes include organometallic halide compounds, organometallic hydrides, and even metal hydrides. Some specific examples include organoaluminum alkyl compounds such as triethylaluminum, triisobutyl aluminum, diethylaluminum chloride, ethyl aluminum dichloride, ethyl aluminum sesquichloride, diethylaluminum hydride, and the like. Other examples of known cocatalysts include compounds capable of forming stable non-coordinating counter anion such as those disclosed in U.S. Pat. No. 5,155,080. Examples of such is triphenyl carbenium tetrakis (pentaflucrophenyl) boronate and tris (pentafluorophenyl) borane. Still another example of a cocatalyst would be a mixture of trimethylaluminum and dimethylfluoroaluminum such as disclosed in Zambelli et al, *Macromolecules*, 22, 2186 (1989).

There are three types of currently preferred catalyst systems. The first, referred to hereinafter as Catalyst System I, is prepared by prepolymerizing the metallocene in the presence of an alkylaluminoxane, optionally in the presence of a particulate material such as silica, and then washing out hydrocarbon soluble material to produce a solid particulate polymerization catalyst system. The second, referred to hereinafter as Catalyst System II is prepared by contacting a carrier with an alkyl aluminum compound and then contacting that product with water to produce a particulate cocatalyst which is then contacted with the metallocene to produce a particulate catalyst system, which may or may not be subjected to prepolymerization before use in forming polymer. The third, i.e. Catalyst System III, is prepared by contacting the metallocene with a relatively insoluble solid compound having hydrocarbyl aluminoxy groups. A currently preferred technique for making such a catalyst system involves contacting a solution of aluminoxane with a crosslinking agent, optionally in the presence of a particulate solid such as silica, to result in a solid cocatalyst having hydrocarbyl aluminoxy groups, then combining that solid with the metallocene to produce a solid catalyst system. The production of such solid cocatalysts is disclosed in U.S. Pat. Nos. 5,411,925; 5,354,721; and 5,436,212, the disclosures of which are incorporated herein by reference.

A particularly preferred embodiment involves the formation of Catalyst System I that is particularly useful for use in slurry form polymerization processes. Catalyst System I is prepared by combining the metallocene with an organoaluminoxane and conducting a prepolymerization to obtain a solid which is recovered and ultimately used as the catalyst system.

The organoaluminoxane component used in preparing the Catalyst System I is an oligomeric aluminum compound having repeating units of the formula

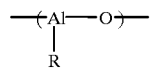

Some examples are often represented by the general formula

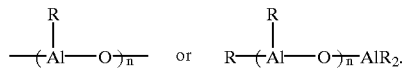

In the general alumoxane formula R is a $C_1$–$C_5$ alkyl radical, for example, methyl, ethyl, propyl, butyl or pentyl and "n" is an integer from 1 to about 50 or greater. Most preferably, R is methyl and "n" is at least 4. Aluminoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an aluminoxane. Generally the reaction of an aluminum alkyl with a limited amount of water is postulated to yield a mixture of the linear and cyclic species of the aluminoxane.

The first step of producing Catalyst System I involves combining the metallocene and aluminoxane in the presence of a suitable liquid to form a liquid catalyst system. It is preferred that the liquid catalyst system be prepared using an organic liquid in which the aluminoxane is at least partially soluble. The currently preferred liquids are hydrocarbons such as hexane or toluene. Typically some aromatic liquid solvent is employed. Examples include benzene, toluene, ethylbenzene, diethylbenzene, and the like. The amount of liquid to be employed is not particularly critical. Nevertheless, the amount should preferably be such as to substantially dissolve the product of the reaction between the metallocene and the aluminoxane, provide desirable polymerization viscosity for the prepolymerization, and to permit good mixing. The temperature is preferably kept below that which would cause the metallocene to decompose. Typically the temperature would be in the range of −50° C. to 100° C. Preferably, the metallocene, the aluminoxane, and the liquid diluent arc combined at about room temperature, i.e. around 0 to 40° C. The reaction between the aluminoxane and the metallocene is relatively rapid. The reaction rate can vary depending upon the ligands of the metallocene. It is generally desired that they be contacted for at least about a minute to about 1 hour or more.

It is within the scope of the invention to form the liquid catalyst system in the presence of a particulate solid. Any number of particulate solids can be employed as the particulate solid. Typically the support can be any organic or inorganic solid that does not interfere with the desired end result. Examples include porous supports such as talc, inorganic oxides, and resinous support materials such as particulate polyolefins. Examples of inorganic oxide materials include Groups 2, 3,13, 4,14 or 5 metal oxides such as silica, alumina, silica-alumina, and mixtures thereof. Other examples of inorganic oxides are magnesia, titania, zirconia, and the like. Other suitable support materials which can be employed include materials such as, magnesium dichloride, and finely divided polyolefins, such as polyethylene. It is within the scope of the present invention to use a mixture of one or more of the particulate solids.

It is generally desirable for the solid to be thoroughly dehydrated prior to use, preferably it is dehydrated so as to contain less than 7% loss on ignition, more preferably less than 1%. Thermal dehydration treatment may be carried out in vacuum or while purging with a dry inert gas such as nitrogen at a temperature of about 20° C. to about 1200° C., and preferably, from about 300° C. to about 800° C. Pressure considerations are not critical. The duration of thermal treatment can be from about 1 to about 24 hours. However, shorter or longer times can be employed provided equilibrium is established with the surface hydroxyl groups.

Dehydration can also be accomplished by subjecting the solid to a chemical treatment in order to remove water and reduce the concentration of surface hydroxyl groups. Chemical treatment is generally capable of converting most or all of the water and hydroxyl groups in the oxide surface to relatively inert species. Useful chemical agents are for example, trimethylaluminum, ethyl magnesium chloride, chlorosilanes such as $SiCl_4$, disilazane, trimethylchlorosilane, dimethylaminotrimethylsilane and the like.

The chemical dehydration can be accomplished by slurrying the inorganic particulate material such as, for example silica, in an inert low boiling hydrocarbon, such as for example, hexane. During the chemical dehydration treatment, the silica should be maintained in a moisture and oxygen free atmosphere. To the silica slurry is then added a low boiling inert hydrocarbon solution of the chemical dehydrating agent, such as, for example dichlorodimethylsilane. The solution is added slowly to the slurry. The temperature ranges during chemical dehydration reaction can be from about 0° C. to about 120° C., however, higher and lower temperatures can be employed. Preferably, the temperature will be about 20° C. to about 100° C. The chemical dehydration procedure should be allowed to proceed until all the substantially reactive groups are removed from the particulate support material as indicated by cessation of gas evolution. Normally, the chemical dehydration reaction will be allowed to proceed from about 10 minutes to about 16 hours, preferably, 1 to 5 hours. Upon completion of the chemical dehydration, the solid particulate material may be filtered under a nitrogen atmosphere and washed one or more times with a dry, oxygen free inert solvent. The wash solvents as well as the diluents employed to form the slurry and the solution of chemical dehydrating agent, can be any suitable inert hydrocarbon. Illustrative of such hydrocarbons are pentane, heptane, hexane, toluene, isopentane and the like.

Another chemical treatment that can be used on solid inorganic oxides such as silica involves reduction by contacting the solid with carbon monoxide at an elevated temperature sufficient to convert substantially all the water and hydroxyl groups to relatively inactive species.

The specific particle size of the support or inorganic oxide, surface area, pore volume, and number of hydroxyl groups is not considered critical to its utility in the practice of this invention. However, such characteristics often determine the amount of support to be employed in preparing the catalyst compositions, as well as affecting the particle morphology of polymers formed. The characteristics of the carrier or support must therefore be taken into consideration in choosing the same for use in the particular invention. It is also within the scope of the invention to use two or more of the dehydration techniques in combination, such as thermal dehydration followed by treatment with trimethylaluminum.

It is also within the scope of the present invention to combine such a particulate solid with the liquid catalyst system after it has been formed and to carry out the prepolymerization in the presence of that solid.

The amount of aluminoxane and metallocene used in forming the liquid catalyst system for the prepolymerization can vary over a wide range. Typically, however, the molar ratio of aluminum in the aluminoxane to transition metal of the metallocene is in the range of about 1:1 to about 20,000:1, more preferably, a molar ratio of about 50:1 to about 2000:1 is used. If a particulate solid, i.e. silica, is used generally it is used in an amount such that the weight ratio of the metallocene to the particulate solid is in the range of about 0.00001/1 to 1/1, more preferably 0.0005/1 to 0.2/1.

The prepolymerization is conducted in the liquid catalyst system, which can be a solution, a slurry, or a gel in a liquid. A wide range of olefins can be used for the prepolymerization. Typically, the prepolymerization will be conducted using an olefin, preferably selected from ethylene and non-aromatic alpha-olefins, and as propylene. It is within the scope of the invention to use a mixture of olefins, for example, ethylene and a higher alpha olefin can be used for the prepolymerization. The use of, a higher alpha olefin, such as 1-butene, with ethylene is believed to increase the amount of copolymerization occurring between the olefin monomer and the olefinically unsaturated portion of the metallocene.

The prepolymerization can be conducted under relatively mild conditions. Typically, this would involve using low pressures of the olefin and relatively low temperatures designed to prevent site decomposition resulting from high concentrations of localized heat. The prepolymerization typically occurs at temperatures in the range of about −15° C. to about +110° C., more preferably in the range of about 0 to about +30° C. The amount of prepolymer can be varied but typically would be in the range of from about 1 to about 95 wt % of the resulting prepolymerized solid catalyst system, more preferably about 5 to 80 wt %. It is generally desirable to carry out the prepolymerization to at least a point where substantially all of the metallocene is in the solid rather than in the liquid since that maximizes the use of the metallocene.

After the prepolymerization, the resulting solid prepolymerized catalyst is separated from the liquid of the reaction mixture. Various techniques known in the art can be used for carrying out this step. For example, the material could be separated by filtration, decantation, or by vacuum evaporation. It is currently preferred, however, not to rely upon vacuum evaporation since it is considered desirable to remove substantially all of the soluble components in the liquid reaction product of the prepolymerization from the resulting solid prepolymerized catalyst before it is stored or used for subsequent polymerization. After separating the solid from the liquid, the resulting solid is preferably washed with a hydrocarbon and then dried using high vacuum to remove substantially all the liquids and other volatile components that might still be associated with the solid. The vacuum drying is preferably carried out under relatively mild conditions, i.e. temperatures below 100° C. More typically the prepolymerized solid is dried by subjection to a high vacuum at a temperature of about 30° C. until a substantially constant weight is achieved. A preferred technique employs at least one initial wash with an aromatic hydrocarbon, such as toluene, followed by washing with a paraffinic hydrocarbon, such as hexane, and then vacuum drying.

It is within the scope of the present invention to contact the prepolymerization reaction mixture product with a liquid in which the prepolymer is sparingly soluble, i.e. a countersolvent for the prepolymer, to help cause soluble prepolymer to precipitate from the solution. Such a liquid is also useful for the subsequent washing of the prepolymerized solid.

It is also within the scope of the present invention to add a particulate solid of the type aforementioned after the prepolymerization. Thus one can add the solid to the liquid prepolymerization product before the countersolvent is added. In this manner soluble prepolymer tends to precipitate onto the surface of the solid to aid in the recovery of the filtrate in a particulate form and to prevent agglomeration during drying. The liquid mixture resulting from the prepolymerization or the inventive solid prepolymerized catalyst can be subjected to sonification to help break up particles if desired.

Further, if desired the recovered solid prepolymerized catalyst system can be screened to give particles having sizes that meet the particular needs for a particular type of polymerization.

Another option is to combine the recovered inventive solid prepolymerized catalyst system with an inert hydrocarbon, such as one of the type used as a wash liquid, and then to remove that liquid using a vacuum. In such a process it is sometimes desirable to subject the resulting mixture to sonification before stripping off the liquid.

The resulting solid prepolymerized metallocene-containing catalyst system is useful for the polymerization of olefins. Generally, it is not necessary to add any additional aluminoxane to this catalyst system. In some cases it may be found desirable to employ small amounts of an organoaluminum compound as a scavenger for poisons. The term organoaluminum compounds include compounds such as triethylaluminum, trimethylaluminum, diethylaluminum chloride, ethylaluminum dichloride, ethylaluminum sesquichloride, and the like. Trialkylaluminum compounds are currently preferred. Also in some applications it may be desirable to employ small amounts of antistatic agents which assist in preventing the agglomeration of polymer particles during polymerization. Still further, when the inventive catalyst system is added to a reactor as a slurry in a liquid, it is sometimes desirable to add a particulate dried solid as a flow aid for the slurry. Preferably the solid has been dried using one of the methods described earlier. Inorganic oxides such as silica are particularly preferred. Currently, it is preferred to use a fumed silica such as that sold under the tradename Cab-o-sil. Generally the fumed silica is dried using heat and trimethylaluminum.

Catalyst System II is prepared by reacting an organoaluminum compound with a suitable carrier and then with water to produce a solid which can be used as a cocatalyst for transition metal olefin polymerization catalysts.

The terms "carrier" as used herein refer to the material that results in a solid product when reacted with the organoaluminum compound and water. The carrier thus does not have to actually be a solid. It is contemplated that the carrier can be any organic, organometallic, or inorganic compound capable of affixing the organoaluminum compound either through absorption, adsorption, Lewis Acid/Lewis Base interactions, or by reaction with hydroxyl groups of the carrier.

A wide range of materials can be used as the carrier. Generally, any material that will result in a solid cocatalyst that remains insoluble in the polymerization diluent during the polymerization process can be employed as the carrier. Thus the carrier includes materials that form solids when reacted with an organoaluminum compound and water as well as solids that are insoluble in the particular liquid diluent that is present during the polymerization. It is generally preferred that the carrier be capable of yielding a particulate solid cocatalyst. The carrier can be a material having surface groups which are known to react with organoaluminum compounds or a material which is free of surface groups which react with organoaluminum compounds. Some examples of materials envisioned for use as a carrier include starch, lignin, cellulose, sugar, silica, alumina, silica-alumina, titania, zirconia, zeolites of silica and/or alumina, magnesia, calcium carbonate, aluminum trifluoride, boron oxide, magnesium dichloride, boric acid, activated carbon, carbon black, organoboranes, organoboroxines, $Si(OMe)_3Me$, hydrocarbyl polyalcohols, boric acid, alumina, polyethylene, polyethylene glycol, and the like. One embodiment comprises dissolving polyethylene in a suitable organic solvent then adding the organoaluminum compound and then adding the water to produce a solid cocatalyst. It is generally preferred that the carrier that is reacted with the organoaluminum compound be relatively free of water, i.e. that it contain less than about 5 weight percent water, more preferably less than 1 weight percent water.

The term organoaluminum compound as used herein with reference to forming Catalyst System II, refers to compounds of the formula $R_n AlX_{3-n}$ wherein n is a number in the range of 1 to 3, each R is the same or different organo radical, preferably a hydrocarbyl radical, and each X is a halide. Typically the organo radicals would have 1 to 12 carbon atoms, more preferably 1 to 5 carbon atoms. Some examples of organoaluminum compounds include trialkylaluminum compounds, triarylaluminum compounds, dialkylaluminum hydrides, diarylaluminum hydrides, aryl alkyl aluminum hydrides, dialkylaluminum halides, alkyl aluminum dihalides, alkyl aluminum sesquihalides, and the like. Some specific examples of such organoaluminum compounds include trimethylaluminum, triethylaluminum, dimethylaluminum chloride, triisopropylaluminum, triisobutylaluminum, trihexylaluminum, diethylaluminum chloride, ethyl aluminum dichloride, ethyl aluminum sesquichloride, dimethyl aluminum chloride, and the like. The currently preferred organoaluminum compounds are the alkyl aluminum compounds, especially the trialkylaluminum compounds, with trimethylaluminum being particularly preferred. It is also within the scope of the present invention to use mixtures of such organoaluminum compounds.

The organoaluminum compound can be contacted with the carrier in a suitable manner. For example a particulate solid carrier could be contacted with a suitable gas containing the organoaluminum compound and then contacted with a gas containing water liquid diluent. Alternatively, the carrier and the organoaluminum compound can be contacted in an organic liquid and then the resulting product contacted with water. Preferably the organic liquid diluent is anhydrous, i.e. substantially free of water. Examples of what is meant by organic liquid include hydrocarbons such as heptane, octane, decane, dodecane, kerosene, cyclopentane, cyclohexane, methylcyclopentane, benzene, toluene, and xylene as well as halogenated compounds such as chlorobenzene and the like, as well as mixtures thereof. It is within the scope of the invention to simply admix the carrier and a liquid diluent solution of the organoaluminum compound. Another option is to add a solution of the organoaluminum compound to a slurry of the carrier in a liquid diluent.

The amount of liquid diluent employed can vary over a wide range. Typically the amount of liquid, including liquid accompanying the added organoaluminum compound, would be in the range of about 0.1 to about 5000 ml/gram of carrier or more often about 5 to about 200 ml/gram of carrier. The amount of the organoaluminum compound relative to the carrier can vary over a wide range depending upon the particular material selected as the carrier and the particular results desired. The amount necessary to provide the greatest yield of the most active cocatalyst for a specific carrier and a specific organoaluminum compound can be readily determined by routine experimentation. A typical range for the amount of the organoaluminum compound would be from about 0.0001 moles/gram of carrier to about 1 mole/gram of carrier.

The temperature at which the organoaluminum compound and the carrier are contacted can vary over a wide range. Typically it would be carried out at a temperature in the range of about −50° C. to about the boiling point of the liquid diluent, if used, more generally in the range of about −50° C. to about 200° C. It is currently preferred to carry out the contacting at a temperature in the range of about 10 to about 100° C. Higher temperatures can speed up the process for producing the solid cocatalyst. Higher pressures can allow for the use of higher temperatures.

After the contacting of the carrier with the organoaluminum compound is complete the resulting product is contacted with water. This is the most critical step of producing the solid cocatalyst. The water can be introduced in any convenient manner. For example, a slurry of water in a hydrocarbon can be added to liquid containing the reaction product or water can just be added directly to the liquid containing the reaction product. Other options would include adding ice or adding a solid containing water. Preferably, for safety reasons the water is added slowly while the slurry is agitated as by stirring. It is currently preferred to introduce the water into the slurry as a gas, preferably in an inert carrier gas such as nitrogen or argon. The introduction of the water via an inert carrier gas has been found to result in a more uniform distribution of the cocatalyst components on the surface of the carrier. The temperature employed during the water addition can vary over a wide range depending upon the technique being employed but is typically in the range of about −100° C. to about 100° C. In a preferred embodiment, in which the water is added to the water via an inert gas, the gas is passed through a heated vessel containing water and is then passed into the vessel containing the slurry, which is also preferably heated.

The amount of water necessary to produce the cocatalyst for Catalyst System II can vary depending upon the particular carrier selected, the amount of organoaluminum compound employed, and the amount of groups on that carrier which will react with the organoaluminum compound. The optimum amount of water to be added for a particular carrier can be readily determined by routine experimentation. Generally the water will be employed in an amount such that the molar ratio of added water to the aluminum of the organoaluminum compound will be in the range of about 0.1/1 to about 3/1, more preferably the range for the molar ratio of the water to the aluminum of the organoaluminum compound is in the range of about 0.2/1 to about 1.5/1, or even still more preferably about 0.5/1 to about 1.2/1. The reaction time can range from a few minutes to several hours and can often be monitored by observing the temperature and/or the evolution of gases.

After the reaction with the water has been completed, the resulting solid product is combined with a metallocene to form Catalyst System II. In one preferred embodiment, the Catalyst System is subjected to a prepolymerization, preferably in the presence of hydrogen, before being actually used to produce commercial scale quantities of polymer. The prepolymerization can be conducted using the same type of monomers and conditions as described above in regard to Catalyst System I.

The metallocene can be combined with the cocatalyst in any suitable manner. One technique involves adding the metallocene to a slurry resulting from the production of the cocatalyst, or alternatively, the solids of the slurry can be filtered and optionally washed and then combined with the metallocene, or the liquid of the slurry can be evaporated and the resulting solids then combined with the metallocene to form the solid catalyst system. Typically, the metallocene catalyst is combined with the solid cocatalyst in a liquid diluent, preferably a liquid diluent in which the catalyst is soluble. The resulting catalyst system can be prepolymerized directly or it can be separated from the liquid and then prepolymerized. Such a recovered solid catalyst system can be washed with a hydrocarbon, preferably an aliphatic hydrocarbon, and dried, preferably under a high vacuum before being prepolymerized.

The amount of the metallocene that is combined with the inventive cocatalyst can vary over a wide range depending upon the particular catalyst and cocatalyst selected and the particular results desired. Typically the polymerization catalyst is employed in such an amount that the atomic ratio of the Al of the cocatalyst to the metal of the polymerization catalyst is in the range of about 1/1 to about 10000/1, more preferably about 10/1 to 1000/1.

The temperature at which the metallocene and the cocatalyst are combined is not considered to be particularly critical. Typically this is done at temperatures in the range of about −50° C. to about 300° C., or more preferably about 0° C. to about 100° C., or still more preferably about 10° C. to about 80° C. Typically the catalyst system can be employed shortly after the inventive cocatalyst and the polymerization catalyst are brought together.

The prepolymerization can be conducted using olefins such as those normally polymerized by the polymerization catalysts. The currently preferred olefin being ethylene either alone or in combination with alpha olefins such as propylene, butene, 1-hexene, 4-methyl-1-pentene, and the like. The prepolymerizations can be conducted under a wide range of conditions. Typically it is preferred to conduct the prepolymerization in a liquid diluent at temperatures in the range of about −15° C. to about 200° C., more typically about 0° C. to about 100° C. The amount of prepolymerization conducted can vary; however, typically would be such that the prepolymer would be in the range of from about 1 to about 95 weight percent of the resulting prepolymerized catalyst system, more preferably about 5 to 80 weight percent.

In a currently preferred embodiment, a prepolymerized catalyst system is prepared by reacting the carrier with the organometallic compound in a liquid diluent, then adding the water to that slurry, then after the reaction is substantially complete adding the metallocene to the slurry, then the slurry is contacted with an olefin under prepolymerization conditions in the presence of hydrogen to produce a prepolymerized solid catalyst system which can be used as is in the slurry or separated from the liquid and dried for subsequent use in a polymerization. While the dried catalyst system can be subjected to washing with a hydrocarbon before being used in a subsequent polymerization, it has been noted that more active catalyst systems in terms of grams of polymer per gram of transition metal result if there is no such washing step.

The catalyst systems of the present invention are particularly useful for the polymerization of alpha-olefins having 2 to 10 carbon atoms. Examples of such olefins include ethylene, propylene, butene-1, pentene-1, 3-methylbutene-1, hexene-1, 4-methylpentene-1, 3-methylpentene-1, heptene-1, octene-1, decene-1, 4,4-dimethyl-1-pentene, 4,4-diethyl-1-hexene, 3,4-dimethyl-1-hexene, and the like and mixtures thereof. The catalysts are also useful for preparing copolymers of ethylene and propylene and copolymers of ethylene or propylene and a higher molecular weight olefin. The catalysts can also be used to produce ethylene-propylene-diene (EPDM) polymers and ethylene-propylene rubber (EPR).

The polymerizations can be carried out under a wide range of conditions depending upon the particular metallocene employed and the particular results desired. Catalyst systems within the scope of this invention are considered to be useful for polymerization conducted under solution, slurry, or gas phase reaction conditions.

When the polymerizations are carried out in the presence of liquid diluents obviously it is important to use diluents which do not have an adverse effect upon the catalyst system. Typical liquid diluents include propane, butane, isobutane, pentane, hexane, heptane, octane, cyclohexane, methylcyclohexane, toluene, xylene, and the like. Typically the polymerization temperature can vary over a wide range, temperatures typically would be in a range of about −60° C. to about 300° C., more preferably in the range of about 20° C. to about 160° C. Typically the pressure of the polymerization would be in the range of from about 1to about 500 atmospheres or even greater. The inventive catalyst system is particularly useful for polymerizations carried out under particle form, i.e., slurry-type polymerization conditions.

It is contemplated that the catalyst systems of the present invention can be employed in generally any type of polymerization where similar catalysts have been employed in the past. The solid inventive catalyst systems are considered to be particularly well suited for slurry type polymerization processes. The conditions employed when using the catalyst systems of the present invention can be the same as those used with prior art systems. Typically when the polymerization is carried out in the presence of a liquid the polymerization will be conducted at a temperature in the range of about −50° C. to about 300° C. and the pressure will be from about normal atmospheric pressure to about 2000 kg/cm$^2$. In some cases it may be desirable to add some additional organoaluminum compound to the polymerization vessel, such as triethylaluminum or triisobutylaluminum as a poison scavenger.

A further understanding of the present invention, its objects, and advantages will be provided by the following example.

EXAMPLE I

A series of experiments were conducted to compare the effectiveness of different metallocenes in catalyst systems which involved combining the respective metallocenes with a cocatalyst prepared by contacting silica with trimethylaluminum and then with an activating amount of water.

The cocatalyst was prepared by suspending 2 g of silica in 100 mL of toluene and then adding 30 mL of a 2 molar toluene solution of trimethylaluminum. The suspension was brought to about 40° C. and water was bubbled through it using a moist argon flow. The amount of water added was 0.75 mL. After the reaction mixture was cooled to room temperature, the metallocene was added. The mixture was stirred and then filtered and dried under a high vacuum.

The metallocenes evaluated were 1-(cyclopentadienyl)-1-(9-fluorenyl)-1-(but-3-enyl)-1-(methyl) methane zirconium dichloride, 1-(cyclopentadienyl)-1-(4-methyl-9-fluorenyl)-1-(but-3-enyl)-1-(methyl) methane zirconium dichloride, and 1-(cyclopentadienyl)-1-(9-fluorenyl) methane zirconium dichloride.

The polymerizations were carried out in a 1 liter laboratory autoclave. First 500 mL of normal pentane containing 1 mL of a 1.6 molar n-hexane solution of triisobutylaluminum was added to a 1 liter round flask and stirred for 10 min. Then 0.2 g of the solid catalyst system was added to that solution. The resulting suspension was then transferred to a laboratory autoclave under argon and heated to 70° C. and exposed to an ethylene pressure of 10 bar. The mixture was stirred for 1 hr. and the reaction terminated by releasing the pressure from the reactor. The results of these comparisons are summarized in the following table.

TABLE 3

| Metallocene | Activity (g/g Zr:hr) | Mη kg/mol |
|---|---|---|
| (Flu-C(H)$_2$-Cp) ZrCl$_2$ | 36 | 460 |
| (Flu-C(Me) (C$_4$=)-Cp) ZrC$_2$ | 518 | 350 |
| (4MeFlu-C(Me) (C$_4$=)-Cp) ZrCl$_2$ | 550 | 330 |

The data demonstrate that the inventive metallocene is more active for the polymerization of ethylene in this catalyst system than were either of the two prior art metallocenes.

That which is claimed is:

1. A catalyst composition comprising the product resulting from the combination of an organometallic cocatalyst and a metallocene represented by the formula R(Z)(Z)MQ$_k$ wherein each Z is bound to M and is a cyclodienyl ligand selected from the group consisting of substituted and unsubstituted cyclopentadienyl, indenyl, tetrahydroindenyl, octahydrofluorenyl, and fluorenyl ligands; with the further proviso that at least one Z is a 9-fluorenyl having a hydrocarbyl substituent having 1 to 10 carbon atoms at the 4 position, R is a structural bridge linking the Z's which is a single tetravalent carbon atom connecting the Z's and which has its other valences satisfied by a terminally unsaturated hydrocarbyl substituent, having 2 to 20 carbon atoms, and by hydrogen or a hydrocarbyl group having 1 to 10 carbon atoms, and 10 M is a metal selected from the group consisting of group 4, 5, and 6 metals of the periodic table, each Q is the same or different and is selected from the group consisting of hydrogen, halogens, and organo radicals; k is a number sufficient to fill out the remaining valences of M.

2. A catalyst composition according to claim 1 wherein one Z is 4-methyl-9-fluorenyl and the other Z is a cyclodienyl ligand other than a substituted or unsubstituted fluorenyl.

3. A catalyst composition according to claim 2 wherein R has one of its valences satisfied by but-3-enyl.

4. A catalyst composition according to claim 1 wherein the cocatalyst is produced by reacting a particulate carrier with an organoaluminum compound and then with water to yield a solid.

5. A catalyst composition according to claim 4 wherein the metallocene is 1-(3-methyl cyclopentadienyl)-1-(4-methyl-9-fluorenyl)-1-(but-3-enyl)-1-(methyl) methane zirconium dichloride.

6. A catalyst composition according to claim 4 wherein the metallocene is 1-(cyclopentadienyl)-1-(4-methyl-9-fluorenyl)-1-(but-3-enyl)-1-(methyl) methane zirconium dichloride.

7. A catalyst composition according to claim 1 produced by combining the metallocene with a solution of an organoaluminoxane and conducting prepolymerization with an olefin to produce a prepolymerized solid, and then washing the solid to remove soluble components, and recovering the solid as a catalyst.

8. A catalyst composition according to claim 1 wherein the cocatalyst comprises an organoaluminoxane.

9. A catalyst composition according to claim 8 wherein the cocatalyst comprises methylaluminoxane.

10. A catalyst composition according to claim 9 wherein the metallocene is 1-(3-methyl cyclopentadienyl)-1-(4-methyl-9-fluorenyl)-1-(but-3-enyl)-1-(methyl) methane zirconium dichloride.

11. A catalyst composition according to claim 9 wherein the metallocene is 1-(cyclopentadienyl)-1-(4-methyl-9-fluorenyl)-1-(but-3-enyl)-1-(methyl) methane zirconium dichloride.

12. A catalyst composition according to claim 7 wherein the metallocene is 1-(3-methyl cyclopentadienyl)-1-(4-methyl-9-fluorenyl)-1-(but-3-enyl)-1-(methyl) methane zirconium dichloride.

13. A catalyst composition according to claim 12 wherein the prepolymerization is conducted in the presence of particulate silica.

14. A catalyst composition according to claim 7 wherein the metallocene is 1-(cyclopentadienyl)-1-(4-methyl-9-fluorenyl)-1-(but-3-enyl)-1-(methyl) methane zirconium dichloride.

15. A catalyst composition according to claim 14 wherein the prepolymerization is conducted in the presence of particulate silica.

16. A process for producing a polymer comprising contacting at least one olefin with a catalyst composition as set forth in claim 1 under suitable reaction conditions.

17. A process according to claims 16 wherein the cocatalyst comprises methylaluminoxane.

18. A process according to claim 17 wherein the metallocene is 1-(3-methyl cyclopentadienyl)-1-(4-methyl-9-fluorenyl)-1-(but-3-enyl)-1-(methyl) methane zirconium dichloride.

19. A process according to claim 17 wherein the metallocene is 1-(cyclopentadienyl)-1-(4-methyl-9-fluorenyl)-1-(but-3-enyl)-1-(methyl) methane zirconium dichloride.

20. A process according to claim 18 wherein ethylene is polymerized.

21. A process according to claim 18 wherein ethylene and hexene are copolymerized.

22. A process according to claim 19 wherein propylene is polymerized.

23. A process according to claim 22 wherein propylene is the sole olefin monomer.

24. A process according to claim 16 wherein the cocatalyst is produced by reacting a particulate carrier with an organoaluminum compound and then with water to yield a solid.

25. A process according to claim 24 wherein the metallocene is 1-(3-methyl cyclopentadienyl)-1-(4-methyl-9-fluorenyl)-1-(but-3-enyl)-1-(methyl) methane zirconium dichloride.

26. A process according to claim 24 wherein the metallocene is 1-(cyclopentadienyl)-1-(4-methyl-9-fluorenyl)-1-(but-3-enyl)-1-(methyl) methane zirconium dichloride.

27. A process according to claim 16 wherein the catalyst composition is produced by combining the metallocene with a solution of an organoaluminoxane and conducting prepolymerization with an olefin to produce a prepolymerized solid, and then washing the solid to remove soluble components, and recovering the solid as a catalyst.

28. A process according to claim 27 wherein the metallocene is 1-(3-methyl cyclopentadienyl)-1-(4-methyl-9-fluorenyl)-1-(but-3-enyl)-1-(methyl) methane zirconium dichloride.

29. A process according to claim 28 wherein the prepolymerization is conducted in the presence of particulate silica.

30. A process according to claim 27 wherein the metallocene is 1-(cyclopentadienyl)-1-(4-methyl-9-fluorenyl)-1-(but-3-enyl)-1-(methyl) methane zirconium dichloride.

31. A process according to claim 30 wherein the prepolymerization is conducted in the presence of particulate silica.

32. A process according to claim 31 wherein ethylene is polymerized.

33. A process according to claim 31 wherein propylene is polymerized.

34. A process according to claim 29 wherein ethylene is polymerized.

35. A process according to claim 25 wherein ethylene is polymerized.

36. A process according to claim 26 wherein ethylene is polymerized.

* * * * *